United States Patent
Pan et al.

(10) Patent No.: US 12,006,268 B2
(45) Date of Patent: Jun. 11, 2024

(54) METHOD FOR PREPARING ECOLOGICAL FOAMED CERAMIC FROM LEPIDOLITE FILTER MUD WHOLE WASTE

(71) Applicant: BEIJING UNIVERSITY OF TECHNOLOGY, Beijing (CN)

(72) Inventors: Dean Pan, Beijing (CN); Xiaoguang Zhang, Beijing (CN); Ruhao Kong, Beijing (CN); Qijun Zhang, Beijing (CN); Zhe Tan, Beijing (CN); Wei Wang, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 18/500,592

(22) Filed: Nov. 2, 2023

(65) Prior Publication Data
US 2024/0059619 A1 Feb. 22, 2024

Related U.S. Application Data

(63) Continuation of application No. PCT/CN2023/088354, filed on Apr. 14, 2023.

(30) Foreign Application Priority Data

May 9, 2022 (CN) .......................... 202210496173.1

(51) Int. Cl.
*C04B 38/00* (2006.01)
*C04B 35/00* (2006.01)
(Continued)

(52) U.S. Cl.
CPC .............. *C04B 38/10* (2013.01); *C04B 35/19* (2013.01); *C04B 35/62204* (2013.01);
(Continued)

(58) Field of Classification Search
CPC .. C04B 38/02; C04B 33/132; C04B 35/62204
See application file for complete search history.

(56) References Cited

FOREIGN PATENT DOCUMENTS

| CN | 108191230 | * 6/2018 | ............ C03B 19/06 |
| CN | 108911778 | * 11/2018 | ........... C04B 33/132 |

(Continued)

OTHER PUBLICATIONS

CN-109678553 (Xiaohua) Apr. 2019 (online machine translation), [Retrieved on Jan. 22, 2024]. Retrieved from: Espacenet (Year: 2019).*

(Continued)

*Primary Examiner* — Seyed Masoud Malekzadeh
*Assistant Examiner* — Andres E. Behrens, Jr.
(74) *Attorney, Agent, or Firm* — Nitin Kaushik

(57) ABSTRACT

A method for preparing an ecological foamed ceramic from lepidolite filter mud whole waste belongs to the field of environmental protection and resource reuse. The ecological foamed ceramic with excellent properties can be prepared by using lepidolite filter mud as the main raw materials, including ball milling, homogenization, drying, material distribution, and heat treatment. The amount of lepidolite filter mud in the present invention accounts for more than 90%, which is a whole waste utilization and can achieve high-value utilization of bulk lepidolite filter mud. The present invention uses a composite foaming agent combined with a foaming technology and has the advantages of rapid foaming and controllable pore size compared with a single foaming agent. The ecological foamed ceramic prepared by the present invention meets the industrial standard of CJ/T 299-2008 "Artificial ceramic filter material for water treatment" and has potential application value in domestic sewage treatment.

1 Claim, 2 Drawing Sheets

(51) Int. Cl.
- *C04B 35/19* (2006.01)
- *C04B 35/34* (2006.01)
- *C04B 35/622* (2006.01)
- *C04B 35/626* (2006.01)
- *C04B 38/10* (2006.01)
- *C04B 41/00* (2006.01)

(52) U.S. Cl.
CPC .... *C04B 35/6261* (2013.01); *C04B 35/62655* (2013.01); *C04B 41/0072* (2013.01); *C04B 2235/3472* (2013.01)

(56) References Cited

FOREIGN PATENT DOCUMENTS

| | | | | | |
|---|---|---|---|---|---|
| CN | 109133975 | * | 1/2019 | ............. | C04B 33/04 |
| CN | 109553393 | * | 4/2019 | ........... | C04B 33/131 |
| CN | 109678553 | * | 4/2019 | ............. | C04B 33/04 |
| CN | 111116220 | * | 5/2020 | ............... | B28B 1/50 |
| CN | 111348895 | * | 6/2020 | ......... | C04B 33/1305 |
| CN | 112811923 | * | 5/2021 | ........... | C04B 33/131 |
| CN | 114436557 | * | 5/2022 | ............... | B03D 1/018 |
| CN | 114436557 A | | 5/2022 | | |
| CN | 114907139 | * | 8/2022 | ................ | C02F 1/00 |
| KR | 101367591 B1 | * | 2/2014 | ............. | C04B 35/14 |

OTHER PUBLICATIONS

CN-111348895 (Yihong) Jun. 2020 (online machine translation), [Retrieved on Jan. 22, 2024]. Retrieved from: Espacenet (Year: 2020 ).*

CN-109133975 (Kito) Apr. 2019 (online machine translation), [Retrieved on Jan. 22, 2024]. Retrieved from: Espacenet (Year: 2019).*

CN-108191230 (Hongquan) Jun. 2018 (online machine translation), [Retrieved on Jan. 22, 2024]. Retrieved from: Espacenet (Year: 2018).*

CN-112811923 (Xuexiang;) May 2021 (online machine translation), [Retrieved on Jan. 22, 2024]. Retrieved from: Espacenet (Year: 2021).*

CN-109553393 (Yajun) Apr. 2019 (online machine translation), [Retrieved on Jan. 22, 2024]. Retrieved from: Espacenet (Year: 2019).*

CN-108911778 (Lusheng) Nov. 2018 (online machine translation), [Retrieved on Jan. 22, 2024]. Retrieved from: Google Patents (Year: 2018).*

CN-111116220 (Yeqing) May 2020 (online machine translation), [Retrieved on Jan. 22, 2024]. Retrieved from: Google Patents (Year: 2020).*

KR101367591-B1 (Bae) Feb. 2014 (online machine translation), [Retrieved on Apr. 10, 2024]. Retrieved from: Espacenet (Year: 2014).*

CN-114436557 (Li) May 2022 (online machine translation), [Retrieved on Apr. 10, 2024]. Retrieved from: Espacenet (Year: 2022).*

CN-114907139 (Dean) Aug. 2022 (online machine translation), [Retrieved on Apr. 10, 2024]. Retrieved from: Espacenet (Year: 2022).*

Title of the Item: China Master's Theses Full-text Database Engineering Science and Technology Publication Date: Jan. 15, 2013 Name of the Author: Zeng Chuanlin Article Title: Study on Preparing Lightweight Ceramsite Using Leaching Residual Slag of Lepidolite ore pp. 1; 9-14; 17-44.

* cited by examiner

2

METHOD FOR PREPARING ECOLOGICAL FOAMED CERAMIC FROM LEPIDOLITE FILTER MUD WHOLE WASTE

CROSS-REFERENCE TO RELATED APPLICATIONS

The application claims priority to Chinese patent application No. 2022104961731, filed on May 9, 2022, the entire contents of which are incorporated herein by reference.

TECHNICAL FIELD

The present invention relates to the field of preparing ecological materials from solid waste, and in particular to a method for preparing ecological foamed ceramics from lepidolite filter mud whole waste, which belongs to the field of environmental protection and resource reuse and is suitable for treating filter mud produced by beneficiation of lepidolite. By the present invention, the ecological foamed ceramic meeting the industrial standard of CJ/T 299-2008 "Artificial ceramic filter material for water treatment" can be prepared.

BACKGROUND

With the rapid development of the Lithium-ion battery (Lib) industry, the development and utilization of lithium resources become more and more important. However, the lepidolite ore is of low grade. Producing 1 ton of lithium carbonate will produce nearly 200 tons of tail ores and tail slags. Therefore, the reasonable treatment and disposal of lepidolite tail ores and tail slags is of great significance protection of ecological security.

It can be seen from FIG. 1 of the description that the process flow for producing a lepidolite concentrate through beneficiation, and the yield of the lepidolite beneficiation filter press mud (referred to as lepidolite filter mud for short) during the beneficiation is about 20%. The particle size of the lepidolite filter mud is less than 200 mesh, which has problems such as slow sedimentation, high water content, and difficulty in long-distance transportation and utilization. Chinese patent CN102531394 A discloses "a formulation and production process for producing a microcrystalline panel using lithium tail ores", wherein the raw materials thereof include lithium tail ores, calcium carbonate, quartz sand, sodium carbonate, borax, barium carbonate, zinc oxide, etc. The amount of lithium tail ores added in the present invention is less than 50%. Moreover, the use of microcrystalline panels as high-end decorative materials is small usage and the market is limited, making it impossible to achieve large-scale consumption and utilization. The Chinese patent CN108911778 A proposes "a method for a lithium tail ores light ceramic panel". The foam ceramic panel prepared by using lithium tail ores can be used as building heat insulation and thermal insulation materials, internal and external decoration materials, and has fireproof, heat insulation, and sound absorption properties. However, the amount of tail ores added is about 30%. The consumption amount of tail ores is small, the product turnover frequency is low, and the application scenarios are severely limited. Due to the insufficient consumption amount of lepidolite filter mud by the existing technical means and product types, the lepidolite mining enterprises still treat and dispose the lepidolite filter mud by stacking as the main way, and there is a high ecological security risk.

Ecological foaming ceramics are functional ceramics prepared by sintering and foaming with ceramic solid waste as the main raw material, adding an appropriate amount of foaming agent and modifier, and have a uniform and rich pore structure, which can be widely used in water treatment and gas purification. The ecological foamed ceramic has the advantages of a wide application scene, large usage, and high replacement frequency, and plays an important role in solving the problem of bulk industrial solid waste consumption and reducing environmental pollution, and will produce better social and economic benefits.

Kaolin, quartz, and feldspar, the main components of lepidolite filter mud, are the main raw materials for preparing high-performance ceramics. Therefore, the preparation and high-value utilization of ecological foamed ceramics is expected to achieve large-scale consumption of lepidolite filter mud and solve its accumulation problems and ecological security risks.

SUMMARY

The purpose of the present invention is to prepare an ecological foamed ceramic using lepidolite filter mud whole waste as a raw material and using sodium carbonate and silicon carbide as a composite foaming agent, so as to solve the problem of bulk lepidolite filter mud consumption. At the same time, the ceramic can be used in water purification to achieve "waste to treat waste". The main technical solution is as follows:

Lepidolite filter mud is taken as the main raw material, sodium carbonate and silicon carbide are used as the composite foaming agent, wherein sodium carbonate accounts for 1%-8% of the lepidolite filter mud (dry weight), and silicon carbide accounts for 0.5%-2% of the lepidolite filter mud (dry weight); the ecological foamed ceramic is prepared by ball milling, homogenization, drying, material distribution, and heat treatment.

The preparation steps include:

(1) Ball milling: subjecting the weighed lepidolite filter mud and the composite foaming agent to ball milling to obtain a ball abrasive, wherein the mass ratio of ball-to-material is 1:1-1.2:1; the mass ratio of water-to-material is 0.8:1-1.2:1; the ball milling time is 4-8 h; and an 8 mesh sieve is used in a discharging process of the ball milling: the mass of the material is the total mass of the dry weight of the lepidolite filter mud and the composite foaming agent;

(2) Homogenization: subjecting the ball abrasive obtained in step (1) to homogenizing to obtain a homogenized material, wherein during the homogenizing, the stirring speed of the homogenization process is 0.5-2 r/min, and the homogenization time is 6-12 h; after homogenization, the material is passed through a 60-mesh sieve.

(3) Drying: subjecting the homogenized material obtained in step (2) to spray drying to obtain a dried material;

(4) Material distribution: subjecting the dried material obtained in step (3) to material distribution to obtain a green body; and (5) Heat treatment: subjecting the green body obtained in step (4) to a heat treatment to obtain the ecological foamed ceramic, wherein the specific heat treatment comprises: increasing the temperature from room temperature at a temperature rising rate of 8-15° C./min to 500-700° C., holding for 20-60 min, increasing the temperature at a temperature rising rate of 3-8° C./min to 1050-1200° C., holding for 30-60 min, decreasing the temperature at a cooling rate of 5-10° C./min to 700-800° C., holding for 10-30 min, and cooling for 80-120 min with a furnace to room temperature after the end of the firing.

The cell structure of the foamed ceramic prepared in the present invention is controlled by the type, amount, and particle size of the foaming agent; the pore size is affected by system viscosity and can be controlled by adjusting temperature and composition.

The present invention relates to a method for preparing an ecological foamed ceramic from the lepidolite filter mud whole waste, which has the advantages of using a large amount of lepidolite filter mud, adding a small amount of foaming agent, no other auxiliary raw materials, and effectively reducing the cost of raw materials.

DETAILED DESCRIPTION OF THE EMBODIMENTS

Example 1

Figure 1:
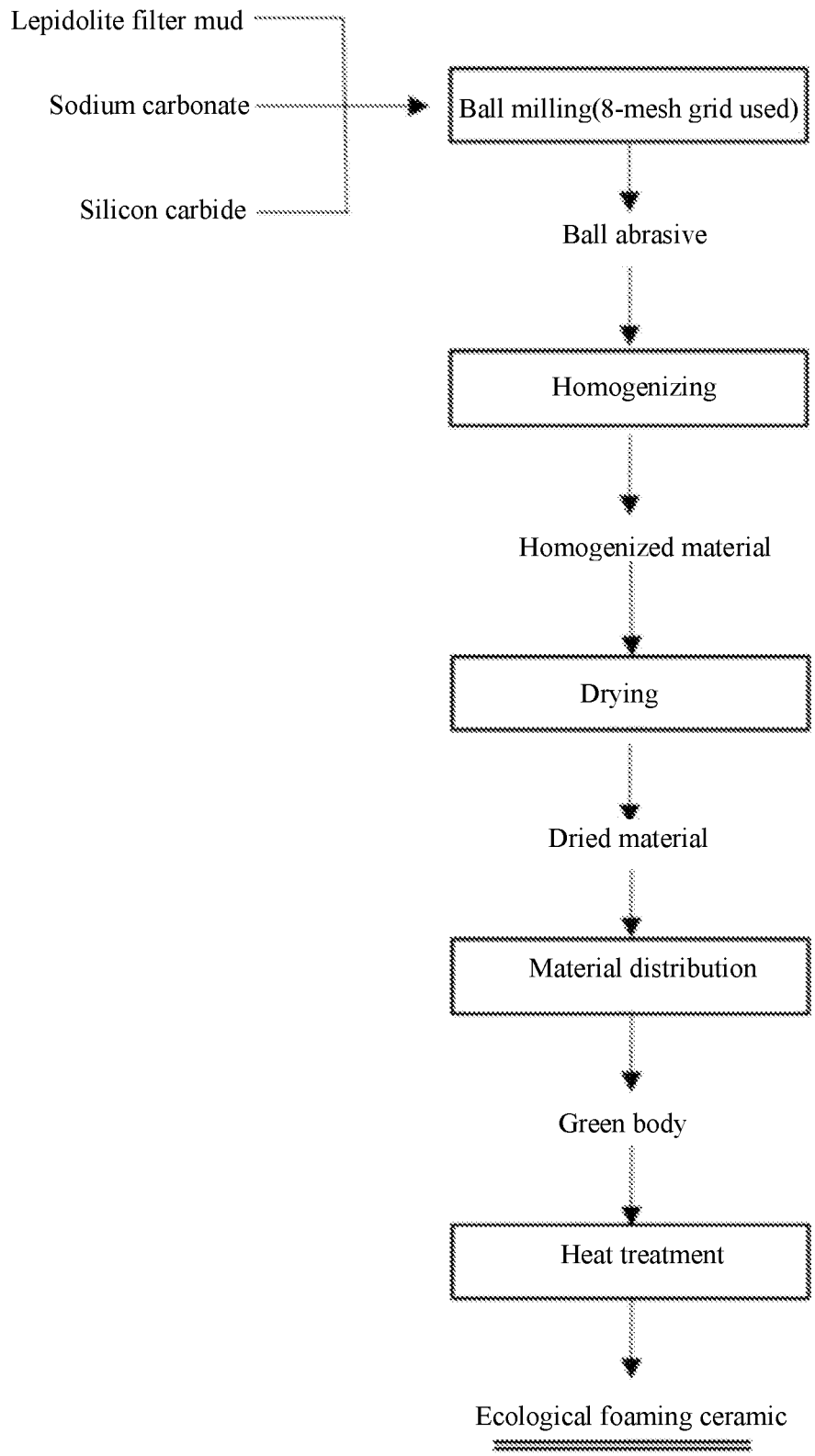
FIG. 1 is a beneficiation flow chart for the production of lepidolite filter mud.
Figure 2:
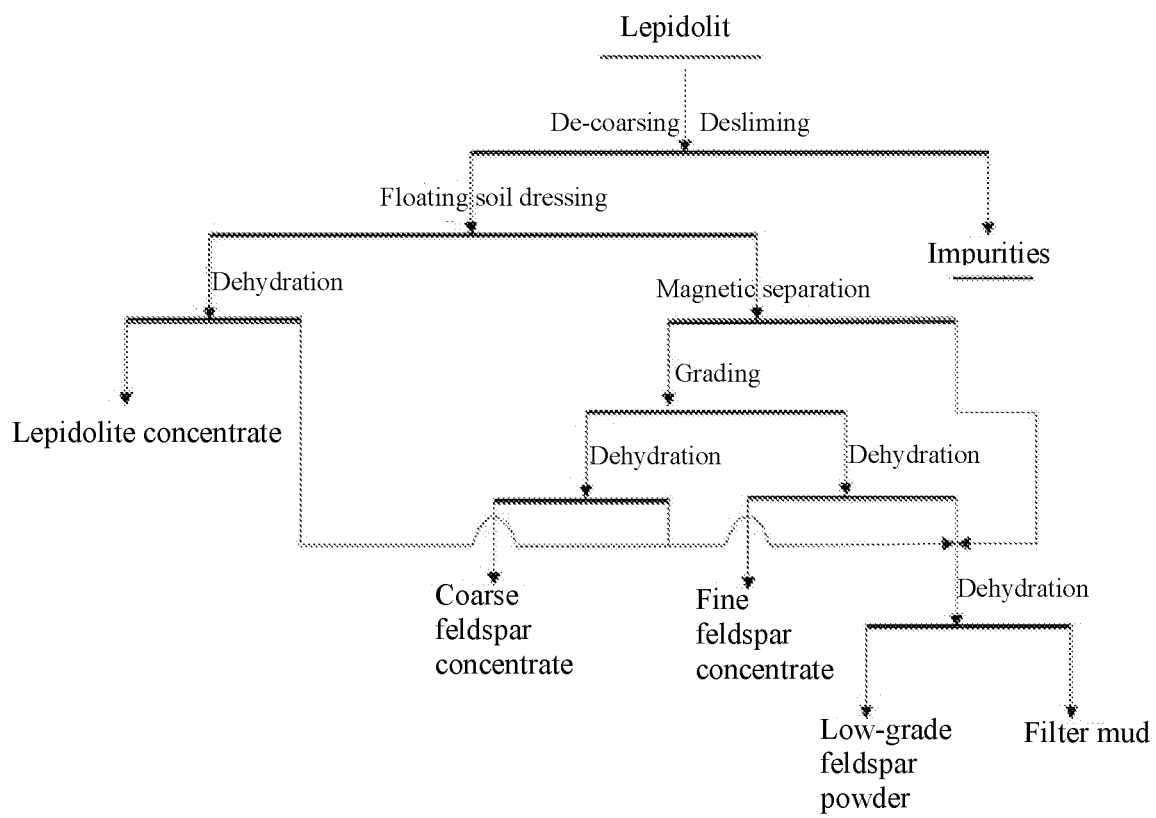
FIG. 2 is a flow chart of the method for preparing ecological foamed ceramic from lepidolite filter mud whole waste.

Lepidolite filter mud was taken as the main raw material, sodium carbonate and silicon carbide were used as the composite foaming agent, wherein sodium carbonate accounted for 1% of the lepidolite filter mud (dry weight), and silicon carbide accounted for 2% of the lepidolite filter mud (dry weight). The ecological foamed ceramic was prepared by ball milling, homogenization, drying, material distribution, and heat treatment. The preparation steps included:

(1) Ball milling: the weighed lepidolite filter mud and the composite foaming agent were subjected to ball milling to obtain a ball abrasive, wherein the mass ratio of ball-to-material was 1:1; the mass ratio of water-to-material was 0.8:1; the ball milling time was 4 h; and an 8-mesh grid was used in a discharging process of the ball milling;

(2) Homogenization: the ball abrasive obtained in step (1) was subjected to homogenizing to obtain a homogenized material, wherein during the homogenizing, the stirring speed of the homogenization process was 0.5 r/min, and the homogenization time was 6 h; after homogenization, the material was passed through a 60-mesh sieve.

(3) Drying: the homogenized material obtained in step (2) was subjected to spray drying to obtain a dried material;

(4) Material distribution: the dried material obtained in step (3) was subjected to material distribution to obtain a green body; and (5) Heat treatment: the green body obtained in step (4) was subjected to a heat treatment to obtain the ecological foamed ceramic, wherein the specific heat treatment included: increasing the temperature from room temperature at a temperature rising rate of 8° C./min to 500° C., holding for 20 min, increasing the temperature at a temperature rising rate of 3° C./min to 1050° C., holding for 30 min, decreasing the temperature at a cooling rate of 5° C./min to 700° C., holding for 10 min, and cooling for 80 min with a furnace to room temperature after the end of the firing.

Example 2

Lepidolite filter mud was taken as the main raw material, sodium carbonate and silicon carbide were used as the composite foaming agent, wherein sodium carbonate accounted for 8% of the lepidolite filter mud (dry weight), and silicon carbide accounted for 0.5% of the lepidolite filter mud (dry weight). The ecological foamed ceramic was prepared by ball milling, homogenization, drying, material distribution, and heat treatment. The preparation steps included:

(1) Ball milling: the weighed lepidolite filter mud and the composite foaming agent were subjected to ball milling to obtain a ball abrasive, wherein the mass ratio of ball-to-material was 1.2:1; the mass ratio of water-to-material was 1.2:1: the ball milling time was 8 h; and an 8-mesh grid was used in a discharging process of the ball milling;

(2) Homogenization: the ball abrasive obtained in step (1) was subjected to homogenizing to obtain a homogenized material, wherein during the homogenizing, the stirring speed of the homogenization process was 2 r/min, and the homogenization time was 12 h; after homogenization, the material was passed through a 60-mesh sieve.

(3) Drying: the homogenized material obtained in step (2) was subjected to spray drying to obtain a dried material;

(4) Material distribution: the dried material obtained in step (3) was subjected to material distribution to obtain a green body; and (5) Heat treatment: the green body obtained in step (4) was subjected to a heat treatment to obtain the ecological foamed ceramic, wherein the specific heat treatment included: increasing the temperature from room temperature at a temperature rising rate of 15° C./min to 700° C. holding for 60 min, increasing the temperature at a temperature rising rate of 8° C./min to 1200° C., holding for 60 min, decreasing the temperature at a cooling rate of 10° C./min to 800° C., holding for 30 min, and cooling for 120 min with a furnace to room temperature after the end of the firing.

Example 3

Lepidolite filter mud was taken as the main raw material, sodium carbonate and silicon carbide were used as the composite foaming agent, wherein sodium carbonate accounted for 5% of the lepidolite filter mud (dry weight), and silicon carbide accounted for 1% of the lepidolite filter mud (dry weight). The ecological foamed ceramic was prepared by ball milling, homogenization, drying, material distribution, and heat treatment. The preparation steps included:

(1) Ball milling: the weighed lepidolite filter mud and the composite foaming agent were subjected to ball milling to obtain a ball abrasive, wherein the mass ratio of ball-to-material was 1.1:1; the mass ratio of water-to-material was 1:1: the ball milling time was 6 h; and an 8-mesh grid was used in a discharging process of the ball milling;

(2) Homogenization: the ball abrasive obtained in step (1) was subjected to homogenizing to obtain a homogenized material, wherein during the homogenizing, the stirring speed of the homogenization process was 1 r/min, and the homogenization time was 8 h; after homogenization, the material was passed through a 60-mesh sieve.

(3) Drying: the homogenized material obtained in step (2) was subjected to spray drying to obtain a dried material;

(4) Material distribution: the dried material obtained in step (3) was subjected to material distribution to obtain a green body; and (5) Heat treatment: the green body obtained in step (4) was subjected to a heat treatment to obtain the ecological foamed ceramic, wherein the specific heat treatment included: increasing the temperature from room temperature at a temperature rising rate of 10° C./min to 600° C., holding for 40 min. increasing the temperature at a temperature rising rate of 5° C./min to 1100° C., holding for 40 min, decreasing the temperature at a cooling rate of 8° C./min to 750° C., holding for 20 min, and cooling for 100 min with a furnace to room temperature after the end of the firing.

Example 4

Lepidolite filter mud was taken as the main raw material, sodium carbonate and silicon carbide were used as the composite foaming agent, wherein sodium carbonate accounted for 8% of the lepidolite filter mud (dry weight), and silicon carbide accounted for 1% of the lepidolite filter mud (dry weight). The ecological foamed ceramic was prepared by ball milling, homogenization, drying, material distribution, and heat treatment. The preparation steps included:
(1) Ball milling: the weighed lepidolite filter mud and the composite foaming agent were subjected to ball milling to obtain a ball abrasive, wherein the mass ratio of ball-to-material was 1.2:1; the mass ratio of water-to-material was 0.8:1; the ball milling time was 4 h; and an 8-mesh grid was used in a discharging process of the ball milling;
(2) Homogenization: the ball abrasive obtained in step (1) was subjected to homogenizing to obtain a homogenized material, wherein during the homogenizing, the stirring speed of the homogenization process was 2 r/min, and the homogenization time was 6 h; after homogenization, the material was passed through a 60-mesh sieve.
(3) Drying: the homogenized material obtained in step (2) was subjected to spray drying to obtain a dried material;
(4) Material distribution: the dried material obtained in step (3) was subjected to material distribution to obtain a green body; and
(5) Heat treatment: the green body obtained in step (4) was subjected to a heat treatment to obtain the ecological foamed ceramic, wherein the specific heat treatment included: increasing the temperature from room temperature at a temperature rising rate of 8° C./min to 700° C., holding for 20 min, increasing the temperature at a temperature rising rate of 3° C./min to 1200° C., holding for 30 min, decreasing the temperature at a cooling rate of 10° C./min to 700° C., holding for 10 min, and cooling for 120 min with a furnace to room temperature after the end of the firing.

Example 5

Lepidolite filter mud was taken as the main raw material, sodium carbonate and silicon carbide were used as the composite foaming agent, wherein sodium carbonate accounted for 4% of the lepidolite filter mud (dry weight), and silicon carbide accounted for 1.5% of the lepidolite filter mud (dry weight). The ecological foamed ceramic was prepared by ball milling, homogenization, drying, material distribution, and heat treatment. The preparation steps included:
(1) Ball milling: the weighed lepidolite filter mud and the composite foaming agent were subjected to ball milling to obtain a ball abrasive, wherein the mass ratio of ball-to-material was 1.05:1; the mass ratio of water-to-material was 1.15:1; the ball milling time was 5 h: and an 8-mesh grid was used in a discharging process of the ball milling;
(2) Homogenization: the ball abrasive obtained in step (1) was subjected to homogenizing to obtain a homogenized material, wherein during the homogenizing, the stirring speed of the homogenization process was 1.5 r/min, and the homogenization time was 8 h; after homogenization, the material was passed through a 60-mesh sieve.
(3) Drying: the homogenized material obtained in step (2) was subjected to spray drying to obtain a dried material;
(4) Material distribution: the dried material obtained in step (3) was subjected to material distribution to obtain a green body; and
(5) Heat treatment: the green body obtained in step (4) was subjected to a heat treatment to obtain the ecological foamed ceramic, wherein the specific heat treatment included: increasing the temperature from room temperature at a temperature rising rate of 12° C./min to 680° C., holding for 55 min, increasing the temperature at a temperature rising rate of 6° C./min to 1180° C., holding for 45 min, decreasing the temperature at a cooling rate of 7° C./min to 720° C., holding for 25 min, and cooling for 90 min with a furnace to room temperature after the end of the firing.

Example 6

Lepidolite filter mud was taken as the main raw material, sodium carbonate and silicon carbide were used as composite foaming agents, wherein sodium carbonate accounted for 3% of the lepidolite filter mud (dry weight), and silicon carbide accounted for 0.8% of the lepidolite filter mud (dry weight). The ecological foamed ceramic was prepared by ball milling, homogenization, drying, material distribution, and heat treatment. The preparation steps included:
(1) Ball milling: the weighed lepidolite filter mud and the composite foaming agent were subjected to ball milling to obtain a ball abrasive, wherein the mass ratio of ball-to-material was 1:1; the mass ratio of water-to-material was 1.05:1; the ball milling time was 7 h; and an 8-mesh grid was used in a discharging process of the ball milling;
(2) Homogenization: the ball abrasive obtained in step (1) was subjected to homogenizing to obtain a homogenized material, wherein during the homogenizing, the stirring speed of the homogenization process was 1 r/min, and the homogenization time was 10 h; after homogenization, the material was passed through a 60-mesh sieve.
(3) Drying: the homogenized material obtained in step (2) was subjected to spray drying to obtain a dried material;
(4) Material distribution: the dried material obtained in step (3) was subjected to material distribution to obtain a green body; and
(5) Heat treatment: the green body obtained in step (4) was subjected to a heat treatment to obtain the ecological foamed ceramic, wherein the specific heat treatment included: increasing the temperature from room temperature at a temperature rising rate of 9° C./min to 580° C., holding for 30 min, increasing the temperature at a temperature rising rate of 4° C./min to 1080° C., holding for 35 min, decreasing the temperature at a cooling rate of 6° C./min to 780° C., holding for 25 min, and cooling for 90 min with a furnace to room temperature after the end of the firing.

TABLE 1

Performance Test Results for Examples 1 to 6

| | Property | | | | | |
|---|---|---|---|---|---|---|
| Item | Hydrochloric acid solubility (%) | Density (g/cm$^3$) | Apparent Density (g/cm$^3$) | Bulk Density (g/cm$^3$) | Porosity (%) | Specific Area (cm$^2$/g) |
| Index | ≤2 | — | — | — | ≥40 | ≥0.5 × 10$^4$ |
| Example 1 | 1.38 | 0.49 | 0.44 | 0.19 | 56.82 | 15.21 × 10$^4$ |
| Example 2 | 1.42 | 0.58 | 0.53 | 0.14 | 73.58 | 17.86 × 10$^4$ |
| Example 3 | 1.47 | 0.55 | 0.48 | 0.17 | 64.58 | 17.05 × 10$^4$ |
| Example 4 | 1.51 | 0.43 | 0.41 | 0.14 | 65.85 | 17.22 × 10$^4$ |
| Example 5 | 1.51 | 0.41 | 0.39 | 0.15 | 61.54 | 16.58 × 10$^4$ |
| Example 6 | 1.51 | 0.43 | 0.42 | 0.18 | 57.14 | 16.22 × 10$^4$ |

What is claimed is:

1. A method for preparing an ecological foamed ceramic from lepidolite filter mud whole waste, comprising the steps of (1) ball milling: subjecting a weighed lepidolite filter mud and a composite foaming agent to ball milling to obtain a ball abrasive, wherein sodium carbonate and silicon carbide are used as the composite foaming agent, wherein sodium carbonate accounts for 1%-8% of a dry weight of the lepidolite filter mud, and silicon carbide accounts for 0.5%-2% of a dry weight of the lepidolite filter mud; wherein a particle size of the lepidolite filter mud is less than 200 meshes; ball milling is performed in a wet milling manner; a mass ratio of ball-to-material is 1:1-1.2:1, a mass ratio of water-to-material is 0.8:1-1.2:1; a ball milling time is 4-8 h; and an 8-mesh grid is used in a discharging process of the ball milling; the mass of a material is the total mass of a dry weight of the lepidolite filter mud and the composite foaming agent;

(2) homogenization: subjecting the ball abrasive obtained in the step (1) to homogenizing to obtain a homogenized material; wherein a stirring speed of a homogenization process is 0.5-2 r/min, and a homogenization time is 6-12 h; after homogenization, a material is passed through a 60-mesh sieve;

(3) drying: subjecting the homogenized material obtained in the step (2) to spray drying to obtain a dried material;

(4) material distribution: subjecting the dried material obtained in the step (3) to material distribution to obtain a green body; and (5) heat treatment: subjecting the green body obtained in the step (4) to heat-treating to obtain the ecological foamed ceramic, wherein the ecological foamed ceramic meets an industrial standard of CJ/T 299-2008;

wherein the heat treatment comprises: increasing a temperature from room temperature at a temperature rising rate of 8-15° C./min to 500-700° ° C., holding for 20-60 min, increasing the temperature at a temperature rising rate of 3-8° C./min to 1050-1200° C., holding for 30-60 min, decreasing the temperature at a cooling rate of 5-10° C./min to 700-800° C., holding for 10-30 min, and cooling for 80-120 min with a furnace to room temperature after an end of the firing.

* * * * *